United States Patent
Yang et al.

(10) Patent No.: US 6,238,614 B1
(45) Date of Patent: May 29, 2001

(54) SELECTIVE INFILTRATION MANUFACTURING METHOD AND APPARATUS TO FABRICATE PROTOTYPES AND MOULDS BY INFILTRATING MOLTEN DROPLETS SELECTIVELY INTO LAYERS OF POWDER

(75) Inventors: Dong Yol Yang; Hyon Kee Sohn, both of Taejon (KR)

(73) Assignee: Korea Advanced Institute Science and Technology, Taejon (KR)

( * ) Notice: Subject to any disclaimer, the term of this patent is extended or adjusted under 35 U.S.C. 154(b) by 0 days.

(21) Appl. No.: 09/374,562

(22) Filed: Aug. 13, 1999

(30) Foreign Application Priority Data

Aug. 13, 1998 (KR) .................................. 98-032828

(51) Int. Cl.[7] ............................ B29C 35/08; B29C 41/02
(52) U.S. Cl. ............................. 264/497; 419/10; 419/31; 419/62
(58) Field of Search .............................. 264/497; 419/10, 419/31, 62

(56) References Cited

U.S. PATENT DOCUMENTS

| | | |
|---|---|---|
| 4,938,816 | 7/1990 | Beaman et al. . |
| 5,156,697 | * 10/1992 | Bourell et al. ................. 264/497 |

FOREIGN PATENT DOCUMENTS

431924 A2    6/1991   (EP) .

OTHER PUBLICATIONS

Proceeding of Solid Freeform Fabrication Symposium, Free Form Fabrication of Metallic Components Using Laser Engineered Net Shaping (Lens™), M.L. Griffith, D.M. Keicher, C.L. Atwood, J.A. Romero, J.E. Smugeresky, L.D. Harwell, D.L. Greene, Sandia National Laboratories, (undated).

Proceeding of Solid Freeform Fabrication Symposium, Laser Deposition of Metals for Shape Deposition Manufacturing, J.R. Fessler, R. Merz, A.H. Nickel and F.B. Prinz, L.E. Weiss, (undated).

* cited by examiner

Primary Examiner—Leo B. Tentoni
(74) Attorney, Agent, or Firm—Graybeal Jackson Haley LLP

(57) ABSTRACT

The present invention provides a method, which infiltrates super-heated material between preheated powder particles and therefore minimizes heat deformation and increases measurement accuracy. A rapid prototyping apparatus in accordance with the present invention comprises powder material spreading means 10, dispensing infiltration material means 20, laser beam scanning means 30, and control means. The powder material spreading means spread out powders 61 on the surface of platform 52 uniformly while moving along the X axis. The powders are the main material of desired products. The dispensing infiltration material means dispense infiltration materials 63 while moving along three axes and the super-heated infiltration materials 64 by laser beam 43 are infiltrated between the powders selectively. The laser beam scanning means preheat the powders by laser beam 42 within the melting point of the powders and super-heat the infiltration material by laser beam 43. The control means control the powder material spreading means, the dispensing infiltration material means, and the laser beam scanning means on the basis of modeling data of the desired products.

3 Claims, 6 Drawing Sheets

SELECTIVE INFILTRATION MANUFACTURING METHOD AND APPARATUS TO FABRICATE PROTOTYPES AND MOULDS BY INFILTRATING MOLTEN DROPLETS SELECTIVELY INTO LAYERS OF POWDER

BACKGROUND OF THE INVENTION

1. Field of the Invention

The present invention relates to a rapid prototyping method using selective infiltration manufacturing process. More particularly, the present invention relates to a rapid prototyping method, which infiltrates molten material between preheated powder particles and manufactures prototypes and molds.

2. Description of the Conventional Art

Conventional rapid prototyping methods fall into two big categories. One method is the curing method, in which liquid state material is scanned by laser beam. The other method is to put solid powder materials or sheet materials together for desired shapes.

One of curing methods is stereolithography (3D systems Co.), in which liquid state photo-polymer is selectively scanned by laser beam and solidified layers are accumulated. Two implementations of the stereolithography are available. One implementation is to scan the laser beam locally (3D systems Co., Quadrax Co., and Sony Co.) and the other is to scan the whole layer using ultra-violet light lamps (Cubital company and Light Scuipting Co.).

However, solidified photo-polymers are shrunk and therefore distortions are caused. In addition, if products have overhangs, the supports are required in order to keep photo-polymers from falling down. Because polymers are used as materials, the degree of strength of final products is decreased and therefore utility of the products is restricted.

Selective Laser Sintering method (DTM Co.) and three dimension printing methods (MIT, Soligen Co., ProMetal Co. and Z Corp.) employ powder materials. The Selective laser sintering method spreads plastic powder materials and then scans laser beam to combine the powders. The Selective laser sintering method is used to manufacture metal products and molds with the help of metal powder coated on plastics. However, for manufacturing metal products and molds, plastics already coated on the metal powders must be removed and then sintering process is required to combine metal powders. Also, a process like copper infiltration must be done at the end of the whole process to fill the gaps between metal powders. This process usually causes heat deformation of final products and therefore accuracy gets severely deteriorated.

In three dimension printing method, liquid state binders are applied to the surface of the spread powder. Using the three dimension printing method, ceramic shells for investment casting can be directly manufactured. Powders whose basic component is starch can be used in the method. However, post-processing is necessary to increase the density and intensity of final products and therefore shrinkage of the final products due to heat deformation is caused.

In Laminated Object Manufacturing method (Helisys Co.), heated rollers glue thin sheet-type papers and lasers cut them. This process is repeated. This laminated object manufacturing method has advantages in that papers are used as a main material and therefore overall costs are relatively low. But it takes long time to decube the desired part from the paper box. Let's suppose that a product with spherical shape needs to be manufactured by the laminated object manufacturing method. In the middle of the process, papers are to be cut and accumulated. Finally, it is going to take long time to pull out the final product because of remaining of papers, which surround the final product of spherical shape. Now, thanks to recently developed plastic thin material, there are ways to manufacture products of plastics by the laminated object manufacturing method. However, it has same drawbacks as the case of products of papers.

In Fused Deposition Modeling method (Stratasys Co.), filament shape plastic materials are passed through nozzles, which have similar shape of extrusion molds. However, the surface of the final product manufactured by this method is rough because filament shape materials are used.

In recently commercialized Laser Engineered Net Shaping (Sandia National Lab., Optomec Co.) method, metal substrate is locally heated and small melt pool is made. Then, metal powders are dropped into the small melt pool. While the final product is being solidified at the final stage, shape distortion may occur because metal material is completely melted in the process. Also, products with overhangs and cantilevers cannot be manufactured by the LENS method by the same reason.

In Shape Deposition Manufacturing (Stanford University and Carnegie Mellon University) method, metal deposition and CNC machine processing are employed. After metal material is deposited, it is processed to have desired thickness and boundary shape by multi-axis CNC milling machine. Then, the remaining portion of the same layer is filled with other metal materials and CNC milling process is applied again to deposit another layer. After the processes of one layer are finished, shot peening operation is performed to eliminate residual stress. The main drawback of the SDM method is that it takes relatively long time to manufacture products.

REFERENCES

1. European Patent Documents

EP-431924 A, Jun. 24, 1991, Three Dimensional Printing process to fabricate moulds and prototypes involving selectivity applying binder to successively deposited powder layers 2. U.S. Patent Documents U.S. Pat. No. 4,938,816, Jul. 3, 1990, Selective laser sintering with assisted powder handling 2. Other Publications Proceeding of Solid Freeform Fabrication Symposium, pp125~132, M. L. Griffith et al., "Free Form Fabrication of Metallic Components Using Laser Engineered Net Shaping Lens".

Proceeding of Solid Freeform Fabrication Symposium, pp117~124, J. R. Fessler et al., "Laser Deposition of Metals for Shape Deposition Manufacturing".

SUMMARY OF THE INVENTION

A rapid prototyping method in accordance with the present invention comprises the following steps. First step is to spread out powders on the surface of platform uniformly and the powders are the main material of desired products. Second step is to preheat the powders by laser beam within the melting point of the powders. Third step is to infiltrate super-heated materials selectively. The super-heated materials are dissolved and filled the space among the powders. The three steps above are repeated until the desired products are manufactured.

A rapid prototyping apparatus in accordance with the present invention comprises powder material spreading means, dispensing infiltration material means, laser beam scanning means, and control means. The powder material spreading means spread out powders on the surface of platform uniformly while moving along the X axis. The powders are the main material of desired products. The dispensing infiltration material means dispenses infiltration materials while moving along three axes and the infiltration materials are infiltrated between the powders selectively. The laser beam scanning means preheat the powders by laser beam within the melting point of the powders and melt the infiltration material by laser beam. The control means control the powder material spreading means, the dispensing infiltration material means, and the laser beam scanning means on the basis of modeling data of the desired products.

A rapid prototyping apparatus in accordance with the present invention comprises powder material spreading means, dispensing infiltration material means, laser beam scanning means, and control means. The powder material spreading means spread out powders on the surface of platform uniformly while moving along the X axis. The powders are the main material of desired products. The dispensing infiltration material means dispense infiltration materials while moving along three axes and the infiltration materials are infiltrated between the powders selectively. The laser beam scanning means preheat the powders by laser beam within the melting point of the powders. The control means control the powder material spreading mean, the dispensing infiltration material means, and the laser beam scanning means on the basis of modeling data of the desired products.

BRIEF DESCRIPTION OF THE DRAWINGS

The embodiments of the present invention will be explained with reference to the accompanying drawings, in which.

DETAILED DESCRIPTION OF THE PREFERRED EMBODIMENTS

Embodiment 1

Figure 1:
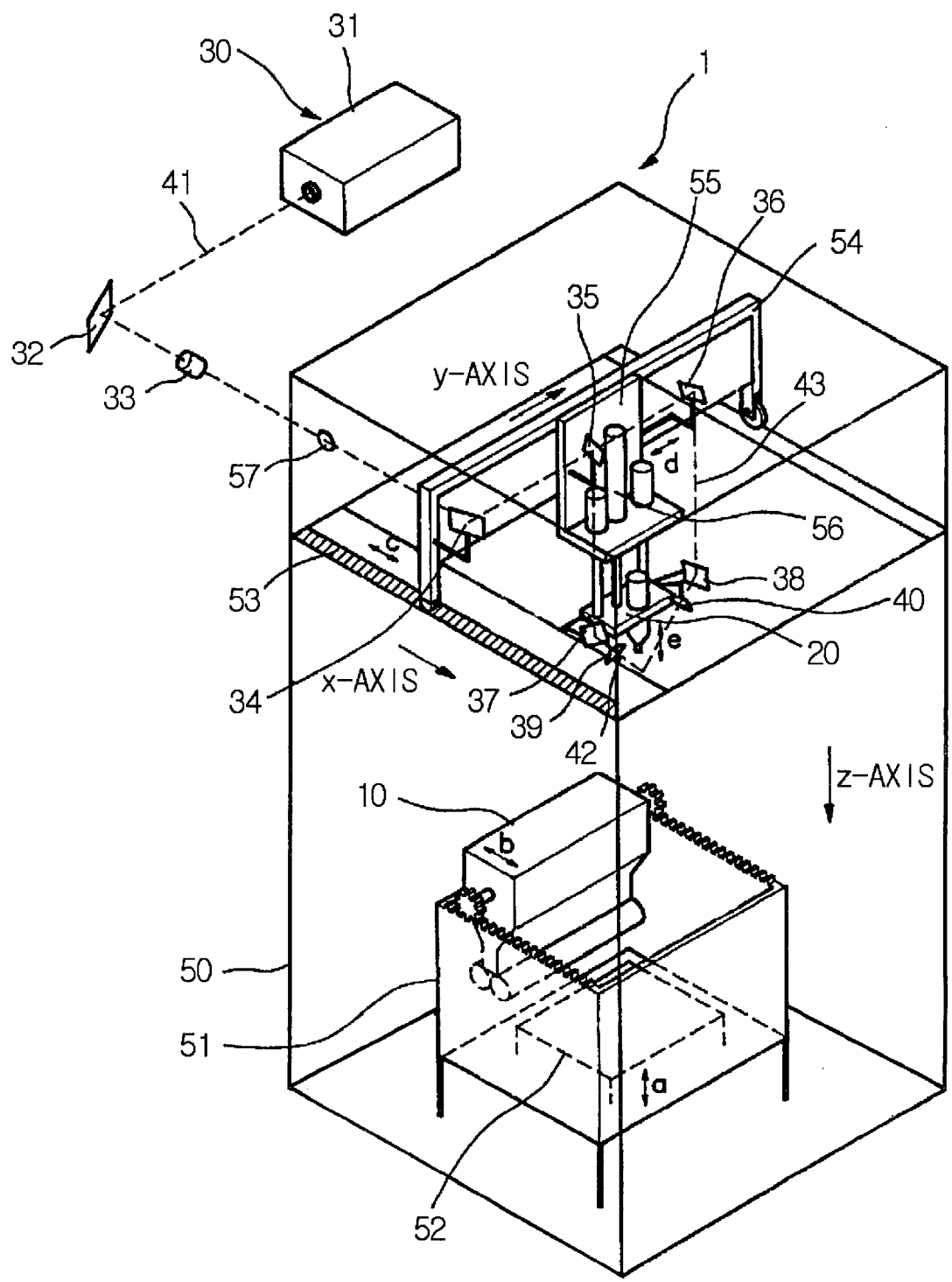
FIG. 1 shows a diagram for illustrating components of rapid prototyping apparatus with respect to the first embodiment of the present invention.
Figure 2:
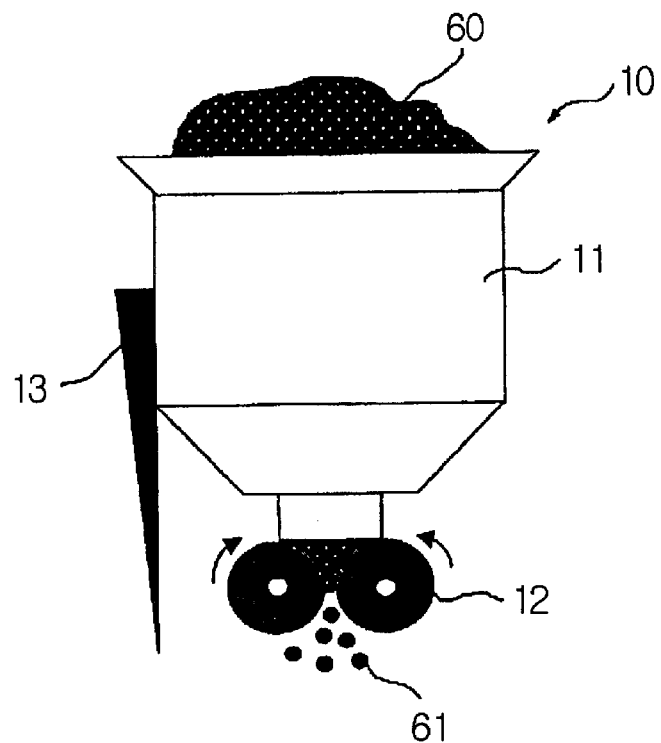
FIG. 2 shows a diagram for illustrating usage of means for spreading powder material of FIG. 1.
Figure 3:
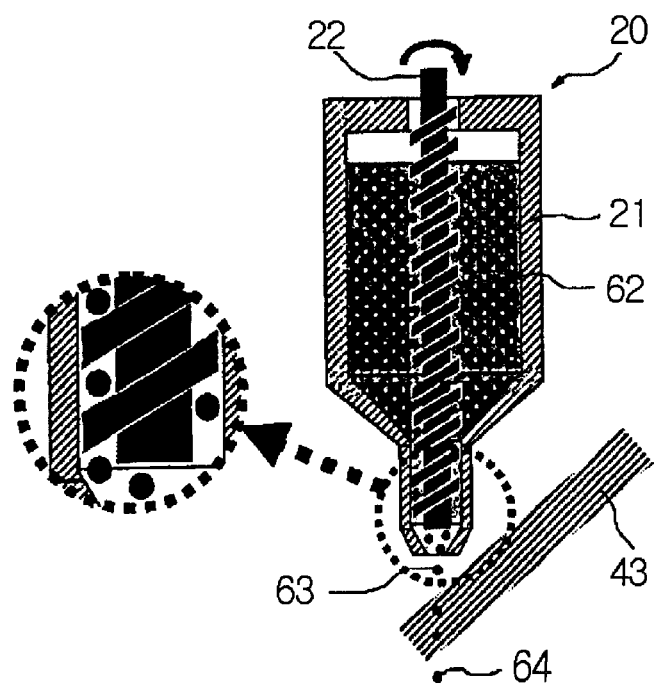
FIG. 3 shows a diagram for illustrating usage of means for dispensing infiltration material of FIG. 1.
Figure 4:
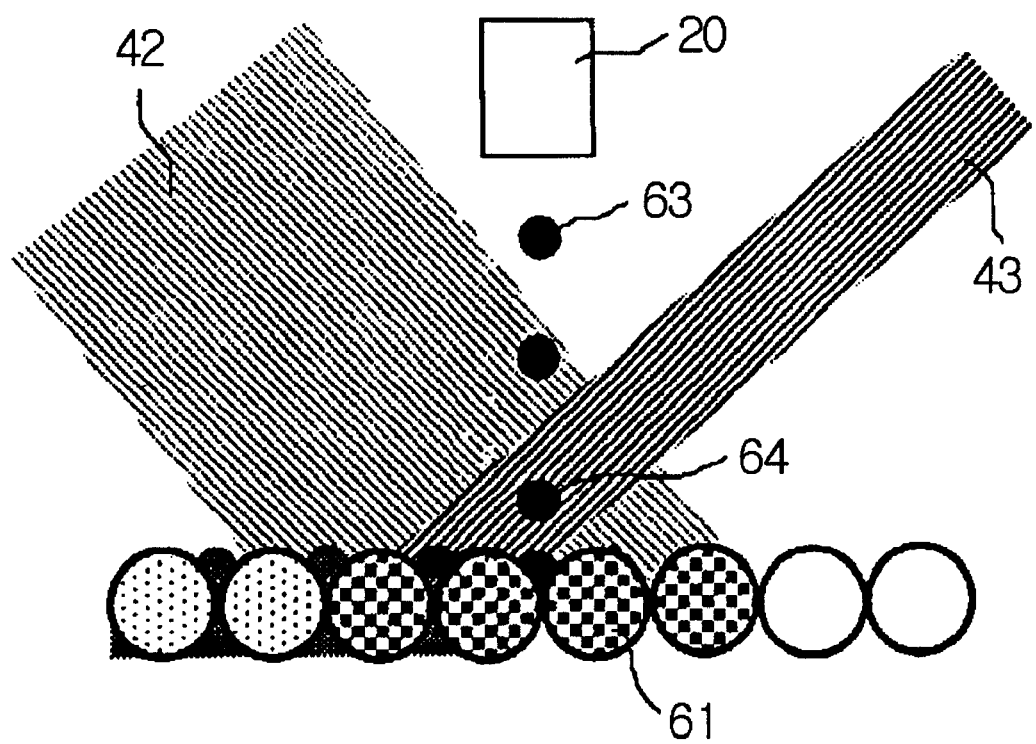
FIG. 4 shows a diagram for illustrating selective infiltration process of the rapid prototyping of FIG. 1.
Figure 5:
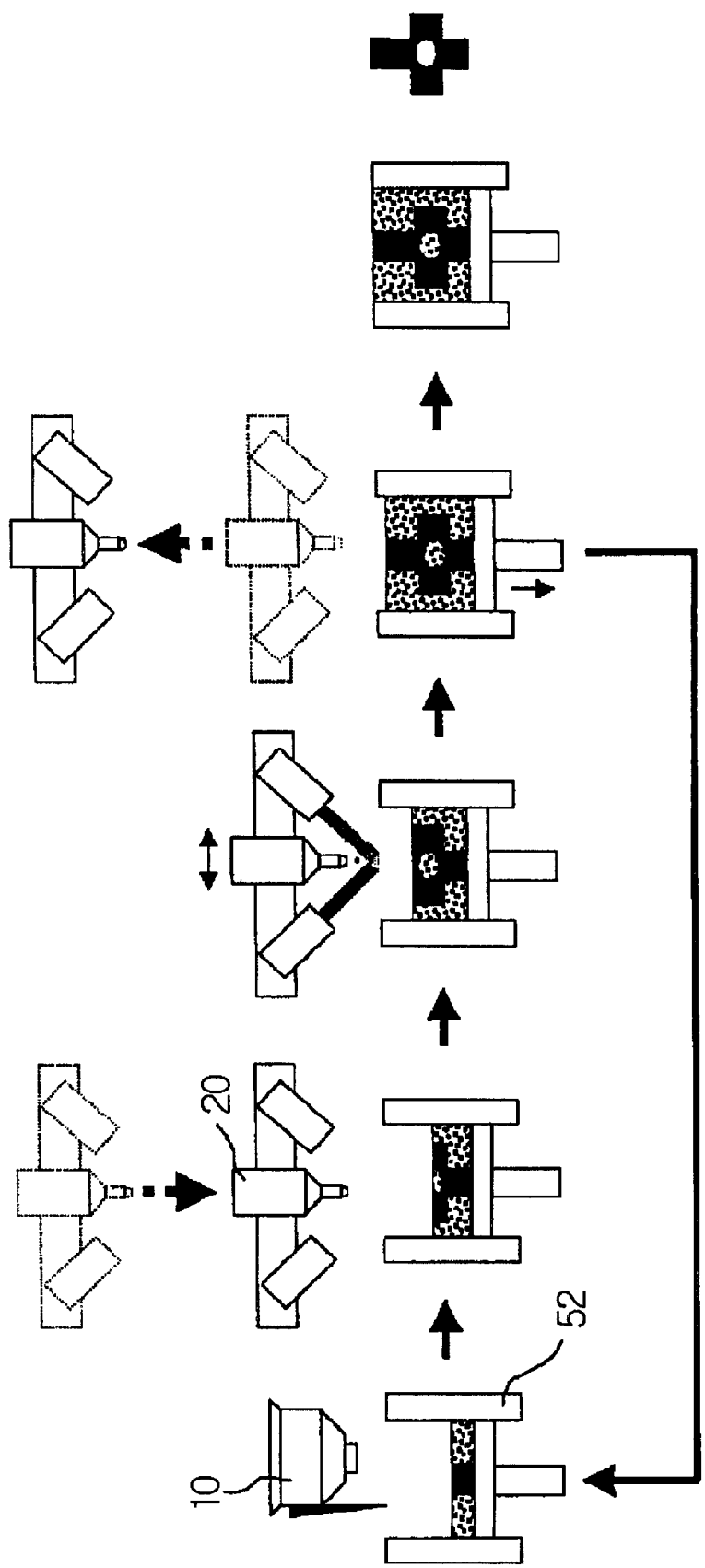
FIG. 5 shows a flow diagram for illustrating the rapid prototyping method using selective infiltration process of the present invention.

FIG. 1 shows a diagram for illustrating components of rapid prototyping apparatus with respect to the first embodiment of the present invention. FIG. 2 shows a diagram for illustrating usage of means for spreading powder material of FIG. 1. FIG. 3 shows a diagram for illustrating usage of means for dispensing infiltration material of FIG. 1. FIG. 4 shows a diagram for illustrating selective infiltration process of the rapid prototyping of FIG. 1. FIG. 5 shows a flow diagram for illustrating the rapid prototyping method using selective infiltration process of the present invention.

As shown in FIG. 1, rapid prototyping apparatus 1 in accordance with the present invention comprises powder material spreading means 10, dispensing infiltration material means in screw-type 20, and laser beam scanning means 30.

Part of laser beam scanning means 30, powder material spreading means 10, and dispensing infiltration material means in screw-type 20 are located inside of the chamber 50. The powder material spreading means 10 is located at the lower part of the chamber 50 and the dispensing infiltration material means in screw-type 20 and the laser beam scanning means 30 are located at the upper part of the chamber 50, that is, the top of the powder material spreading means 10.

A support 51 is installed at the lower part of the chamber 50. A step motor is installed at the bottom of the support 51 and it moves the platform up and down with a certain period.

The powder material spreading means 10 is installed at the upper part of the support 51. The powder material spreading means 10 is shown at FIG. 2 in detail.

Shown in FIG. 2, the powder material spreading means 10 comprises a hopper and the hopper 11 contains powder material. Two rollers 12 are installed at the lower part of the hopper 11 and they send out the powder material 60 as a form of powder 61 with a certain size. A plate 13 is installed at the side of the hopper 11 and it makes the powder 61 spread uniformly on the surface of the platform 52. A motor is installed and it moves the powder material spreading means front and back. At the moment, the rollers 12 are rotated and the powder 61 is sent out toward the bottom.

X axis table is placed at the upper part of the chamber 50. The width of the X axis table has certain size and the X axis table is fixed at both sides of the chamber 50. One of the x axis tables 53 have a screw.

Y axis table 54 is placed perpendicular to the X axis table 53. Y axis table moves front and back with respect to X axis table. The screw in X axis table enables the Y axis table moves front and back easily.

On one side of the Y axis table, Z axis table 55 is placed. Z axis table moves left and right with respect to Y axis table. The principle of movement of Z axis table 55 with respect to Y axis table 54 is same as the principle of movement of Y axis table with respect to X axis table 53.

The Z axis table has Z axis cylinder 56. The Z axis cylinder 56 moves up and down along with Z axis. Dispensing infiltration material means in screw-type 20 is connected with the Z axis cylinder 56. The dispensing infiltration material means in screw-type 20 moves up and down along with Z axis with the help of Z axis cylinder.

The dispensing infiltration material means in screw-type 20 is illustrated in detail in FIG. 3.

The dispensing infiltration material means in screw-type 20 comprises a body part, which contains the powder material 62, as shown in FIG. 3. A screw axis is located at the center of the body part 21 and it sends out the powder material 62 as infiltration powder 63 toward the bottom. The screw axis is rotated by the power of the motor.

Now, the laser beam scanning means is to be reviewed in reference to FIG. 1.

A laser head 31 which scans laser beam, the first reflector 32, and a shutter are located outside of the chamber 50. The second reflector is located at the Y axis table 54. A spectroscope 35 and the third reflector are located at the Z axis table with certain distance between each other. The fourth reflector 37, the fifth reflector 38, the first lens 39, and the second lens 40 are located at the lower part of the Z axis cylinder, which is fixed at Z axis table.

The second reflector 34 can move back and forth along the X axis table 53. The spectroscope 35, the third reflector 36, the fourth reflector 37, the fifth reflector 38, the first lens 39, the second lens 40 can move right and left along the Y axis table 54. The fourth reflector 37, the fifth reflector 38, the first lens 39, and the second lens 40 can move up and down along the Z axis cylinder 56.

The laser head 31 and a number of motors are controlled by the control means. The control means already have modeling data of the desired products and the motors are controlled according to the modeling data.

Now, the rapid prototyping method using selective infiltration process is to be reviewed in reference to the rapid prototyping apparatus 1.

Laser beam is scanned by the laser head 31. The laser beam reaches the second reflector 34 fixed at the Y axis table 54, through the first reflector 32 and the shutter 33. At the moment, laser beam passes through the hole 57, which is located at the side wall of the chamber 50. Then, laser beam reaches the spectroscope 35 fixed at the Z axis table 55. There, a part of the laser beam advances to the fourth reflector 37 fixed at the Z axis cylinder 56 and the other part of the laser beam advances to the third reflector 36 fixed at the Z axis table 55. The laser beam 42 reached the fourth reflector 37 passes through the first lens 39 and the laser beam 43 reached the third reflector passes through the fifth reflector 38 and the second lens 40.

The powder material spreading means 10 moves front and back along the support 51 and spreads the powder 61 on the surface of the platform 52 uniformly. And the Z axis cylinder 56 moves down, then the Y axis table 54 moves front and back and along the X axis table 53. According to such movements made by the Z axis cylinder, the X axis table, the Y axis table and, the dispensing infiltration material means in screw-type 20 dispenses infiltration powder with the direction of front and back, left and right.

The powder spread on the platform 52 is preheated by the laser beam 42 passed through the first lens 39, as shown in FIG. 4. The laser beam 42 is the laser beam defocused and increases the temperature of the powder slightly below the melting point of the powder 61. The phase of the powder is not to be transformed. The infiltration powder 63 dispensed by the dispensing infiltration material means in screw-type 20 is super-heated by the laser beam 43 passed through the second reflector 40. The super-heated molten material 64 is infiltrated selectively between the spread powder 61. Therefore, the space between the powder 61 is filled with the super-heated molten material 64.

Once a selective infiltration process of the powder 61 spread on the platform is done, the platform moves a layer thick toward the bottom. Then, another layer of the powder 61 is to be accumulated by the procedures stated above. The same processes are to be repeated until the desired products are manufactured. When the whole process is ended, the powder placed in which the powder is not designated is to be released from the product.

Plastic powder whose melting point is relatively low and metallic powder whose melting point is relatively high are used as the powders 61, 62. The powder 61 which is the original material of the product can be the powder of high melting point. The powder 62 used as the infiltration material can be used as the powder of low melting point. In other words, two different powder materials 61, 62 can manufacture compound metal products.

Embodiment 2

The rapid prototyping apparatus 2 of the second embodiment in accordance with the present invention employs dispensing infiltration material means in vibration-type 70 instead of dispensing infiltration material means in screw-type 20 of the first embodiment. In addition, some components of the laser beam scanning means 30 of the first embodiment are removed in the laser beam scanning means of the second embodiment. Other than these two modifications, every component of the rapid prototyping apparatus of the second embodiment is the same as the first embodiment. So components performing the same roles or similar roles have same indication numbers in Figures from FIG. 1 to FIG. 8.

Figure 6:
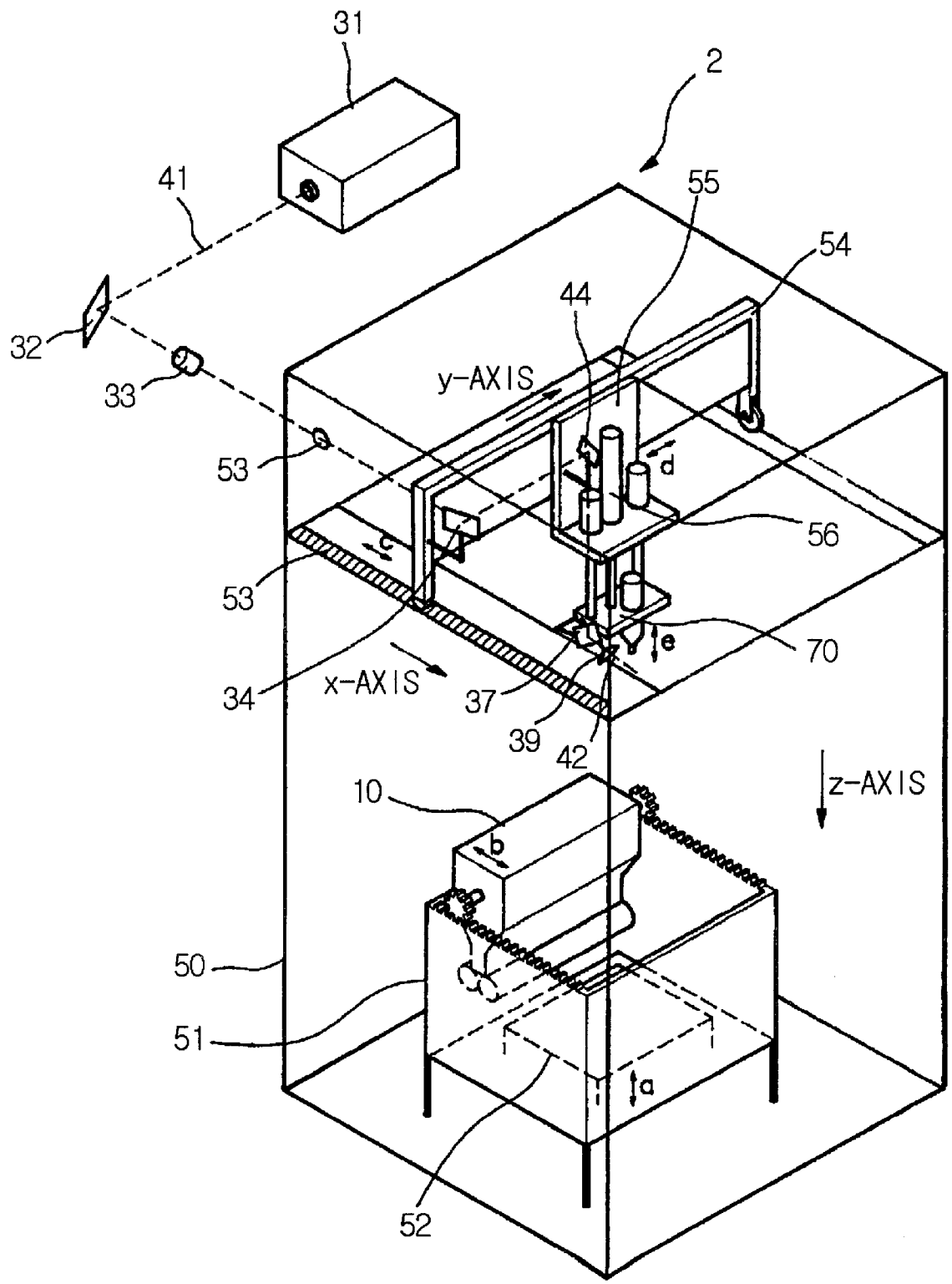
FIG. 6 shows a diagram for illustrating components of rapid prototyping apparatus with respect to the second embodiment of the present invention.
Figure 7:
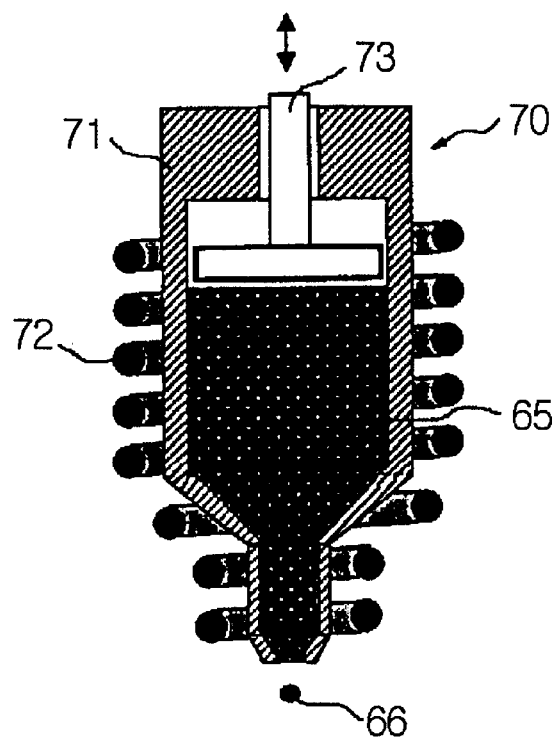
FIG. 7 shows a diagram for illustrating usage of means for dispensing infiltration material of FIG. 6.
Figure 8:
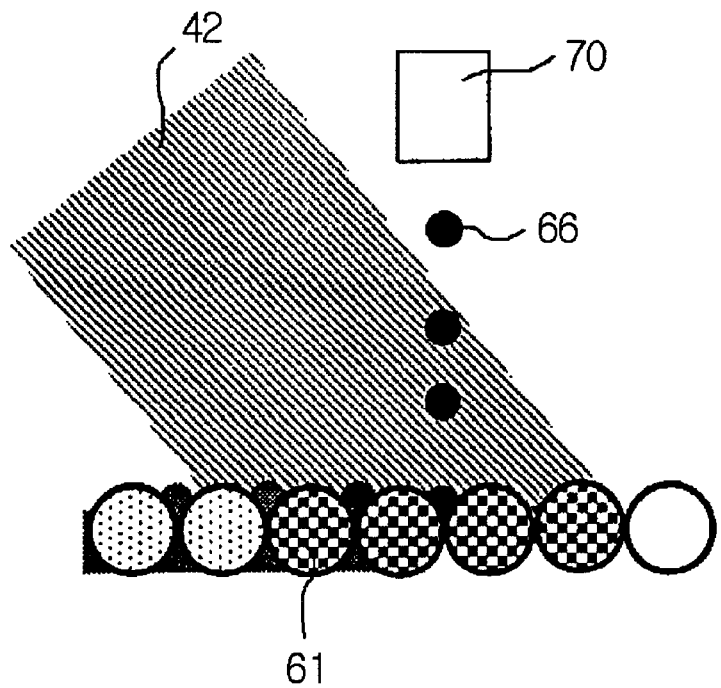
FIG. 8 shows a diagram for illustrating selective infiltration process of the rapid prototyping of FIG. 6.

FIG. 6 shows a diagram for illustrating components of rapid prototyping apparatus with respect to the second embodiment of the present invention. FIG. 7 shows a diagram for illustrating usage of means for dispensing infiltration material of FIG. 6. FIG. 8 shows a diagram for illustrating selective infiltration process of the rapid prototyping of FIG. 6.

Shown in FIG. 7, the dispensing infiltration material means in vibration-type 70 comprises the body part 71 in which material is stored. Heating elements 72 are installed around the body part 71 and they are used to super-heat the material 65. A vibration piston is installed at the upper part of the body part 71. The vibration piston vibrates the super-heated material 65 up and down and dispenses it in the form of droplets 66 onto the spread powders 61. The vibration piston 73 can be a mechanical piston or an ultrasonic piston.

Shown in FIG. 6, the laser beam scanning means of the second embodiment has a reflector 44 instead of the spectroscope 35 of the first embodiment. In addition, the third reflector 36, the fifth reflector 38, and the second lens are not employed in the laser beam scanning means of the second embodiment.

The space between the powders 61 is filled with the super-heated infiltration material 66 from the dispensing infiltration material means in vibration-type 70 and the laser beam scanning means in the second embodiment as shown in FIG. 8. They are preheated by the laser beam 42 passed through the first lens and spread on the surface of the platform 52. Then, the super-heated infiltration material 66 dispensed by the dispensing infiltration material means in vibration-type 70 is infiltrated selectively and the space between the powders 61 is filled with the super-heated infiltration material 66. The same processes are to be repeated until the desired products are manufactured.

The rapid prototyping method in accordance with the present invention provide ways to infiltrates super-heated material selectively between preheated powder particles and therefore minimizes heat deformation and increases measurement accuracy.

In addition, because the method uses selective infiltration, the density of final products is so high that it provides faster manufacturing system than the conventional methods.

The power of the laser beam employed in the present invention is adjustable and therefore various materials can be used in the process.

The method in accordance with the present invention doesn't need additional supports in case that the desired products have overhangs or cantilevers since powder particles which are not yet solidified perform the roles of supports.

Although the preferred embodiments of the present invention have been disclosed for illustrative purposes, those skilled in related art will appreciate that various modifications, additions and substitutions are possible, without departing from the scope and spirit of the invention as recited in the accompanying claims.

What is claimed is:

1. A rapid prototyping method comprising the steps of:

spreading out powders on the surface of platform uniformly, said powders being the main material of desired products;

preheating said powders by laser beam within the melting point of said powders;

infiltrating super-heated materials selectively, said super-heated materials dissolved and filled the space among said powders; and repeating above steps until the desired products are manufactured.

2. The rapid prototyping method according to claim 1, wherein said super-heated materials are formed from infiltration material, said infiltration material being infiltration powder super-heated by laser beam.

3. The rapid prototyping method according to claim 1, wherein said super-heated materials are formed by a heating means of an infiltration material dispenser, said infiltration material dispenser storing and dispensing super-heated materials, said super-heated materials being used as infiltration materials.

* * * * *